United States Patent [19]
Engstrom et al.

[11] Patent Number: 6,134,602
[45] Date of Patent: Oct. 17, 2000

[54] APPLICATION PROGRAMMING INTERFACE ENABLING APPLICATION PROGRAMS TO GROUP CODE AND DATA TO CONTROL ALLOCATION OF PHYSICAL MEMORY IN A VIRTUAL MEMORY SYSTEM

[75] Inventors: G. Eric Engstrom; Craig G. Eisler, both of Kirkland, Wash.

[73] Assignee: Microsoft Corporation, Redmond, Wash.

[21] Appl. No.: 08/936,596

[22] Filed: Sep. 24, 1997

[51] Int. Cl.[7] ............................... G06F 9/00; G06F 9/46; G06F 15/163; G06F 17/00
[52] U.S. Cl. ............................................. 709/328; 709/1
[58] Field of Search ................................. 711/202, 209; 709/1, 310–332

[56] References Cited

U.S. PATENT DOCUMENTS

| | | |
|---|---|---|
| 4,688,167 | 8/1987 | Arun . |
| 4,967,353 | 10/1990 | Brenner et al. . |
| 5,125,086 | 6/1992 | Perazzoli, Jr. . |
| 5,386,536 | 1/1995 | Courts et al. . |
| 5,394,537 | 2/1995 | Courts et al. ........................... 711/202 |
| 5,499,354 | 3/1996 | Aschoff et al. . |
| 5,572,694 | 11/1996 | Uchino ........................................ 709/1 |
| 5,606,685 | 2/1997 | Frandeen . |
| 5,611,064 | 3/1997 | Maund et al. ........................... 711/209 |
| 5,727,178 | 3/1998 | Pletcher et al. . |

FOREIGN PATENT DOCUMENTS

| | | |
|---|---|---|
| 620 523 A2 | 10/1994 | European Pat. Off. . |
| 620 523 A3 | 10/1994 | European Pat. Off. . |
| 713 176 A2 | 5/1996 | European Pat. Off. . |
| 713 176 A3 | 5/1996 | European Pat. Off. . |

OTHER PUBLICATIONS

PCT/US98/16800—International Search Report, Sep. 12, 1998.

"Method of Extending OS/2's Memory management to Recognize"User Focus"", *IBM Technical Disclosure Bulletin*, vol. 35, No. 1A, Jun. 1992, pp. 470–472.

PCT/US98/16802—International Search Report, Sep. 12, 1998.

V. Sohal, Reliable Memory Management for Real–Time Systems, *Electronic Design*, vol. 44, No. 13, Jun. 1996, pp. 118, 120, 122, 124 XP000625394, see page 120, right–hand column, line 7–page 124, left–hand column, line 39.

(List continued on next page.)

*Primary Examiner*—Majid A. Banankhah
*Assistant Examiner*—P. G. Caldwell
*Attorney, Agent, or Firm*—Klarquist Sparkman Campbell Leigh Whinston, LLP

[57] ABSTRACT

An application programming interface (API) enables application programs in a multitasking operating environment to classify portions of their code and data in a group that the operating system loads into physical memory all at one time. Designed for operating systems that implement virtual memory, this API enables memory-intensive application programs to avoid performance degradation due to swapping of units of memory back and forth between the hard drive and physical memory. Instead of incurring the latency of a page fault whenever the application attempts to access code or data in the group that is not located in physical memory, the API makes sure that all of the code or data in a group is loaded into physical memory at one time. This increases the latency of the initial load operation, but reduces performance degradation for subsequent memory accesses to code or data in the group.

9 Claims, 5 Drawing Sheets

OTHER PUBLICATIONS

PCT/US98/16800 —International Search Report, Jan. 22, 1999.

"Packing Variable–Sized Segments in the Swap File of a Paging–Based Virtual Memory System", *IBM Technical Disclosure Bulletin*, vol. 39, No. 3, Mar. 1996, pp. 301/302 XP000581702.

Adrian King, Intel Processor Architecture,*Inside Windows 95*, Microsoft Press, 1994, pp. 45–56.

Adrian King, A Tour of Chicago, *Inside Windows 95*, Microsoft Press, 1994, pp. 85–90.

Adrian King, The Base System, *Inside Windows 95*, Microsoft Press, 1994, pp. 121–131.

APPLICATION PROGRAMMING INTERFACE ENABLING APPLICATION PROGRAMS TO GROUP CODE AND DATA TO CONTROL ALLOCATION OF PHYSICAL MEMORY IN A VIRTUAL MEMORY SYSTEM

FIELD OF THE INVENTION

The invention relates to management of virtual memory in a computer, and more specifically relates to a method for controlling allocation of physical memory in a computer that uses virtual memory to enable concurrently executing programs to share physical memory.

BACKGROUND OF THE INVENTION

The term "virtual memory" refers to a method for allowing several concurrently running application programs to share the physical memory of a computer. The physical memory refers to the main memory of a computer used to execute computer programs and is typically implemented with Random Access Memory (RAM). Multitasking operating systems typically use virtual memory to expand the memory available to each of the application programs executing in the computer. Virtual memory has the effect of making memory appear much larger to applications. To create this effect, a virtual memory manager (VMM) allocates memory from a virtual memory space that is much larger than the size of physical memory. The VMM uses secondary storage space in the computer such as a hard disk to extend the effective size of physical memory. The VMM only loads code and data from secondary storage to physical memory when an application actually needs it, e.g., to process a read or write request.

When a program makes a read or write request to virtual memory, the virtual memory manager determines whether the code or data requested is either located in physical memory or in secondary storage. If it is in physical memory, the virtual memory manager maps the virtual address into a physical address where it is located in physical memory. On the other hand, if the code or data is not in physical memory, the virtual memory manager fetches it from the secondary storage device and places it in physical memory. Thus, the virtual memory manager makes the physical memory appear larger to the application by swapping program code and data in and out of physical memory as needed to satisfy memory requests.

To illustrate the concept of virtual memory, consider an example of an operating system executing on a personal computer with 4 megabytes of physical memory and a hard drive with additional free memory space. The operating system itself might occupy up to a megabyte of the physical memory. If the user wishes to launch a game program occupying 2 Megabytes from the hard drive, then the total memory occupied in physical memory is about 3 Megabytes. Now assume that the game program attempts to load additional code or data files exceeding 1 Megabyte. Under these circumstances there is insufficient physical memory to hold the code and data for the currently executing programs in the computer.

The VMM solves this problem by swapping code and data needed to run the executing programs back and forth between physical memory and the hard drive. For example, if the instructions of a particular piece of code are to be executed, the piece of code must be loaded into physical memory of the computer. Other pieces of code can stay on disk until they are needed. Whenever a piece of code or data is not held in physical memory, the operating system marks its absence by setting (or clearing) a flag associated with that code or data. Then, if an access to that code or data is attempted, the processor will generate a not present interrupt that notifies the operating system of the problem. The operating system then arranges to load the missing code or data into an available area of physical memory and restarts the program that caused the interrupt. The swapping of code and data to and from the hard drive and the interrupts are transparent to the application programs executing in the computer in the sense that the application programs do not process the interrupt nor manage swapping of data back and forth. Rather, the application program only deals with a virtual address space of virtual memory, and the operating system maps requests for virtual memory to physical memory and swaps data back and forth between physical memory and the hard drive.

In a typical virtual memory system, some operating system components are guaranteed access to a portion of physical memory and several other software components contend for the remainder of physical memory. Operating system components that always occupy physical memory include memory resident components of the operating system kernel and a disk cache. The remainder of the physical memory is shared among other software such as dynamically loaded operating system components (DLLs), application program code and data, and dynamically allocated regions of memory such as Direct Memory Access (DMA) buffers and cache regions for the operating system's file system.

The operating system components that always occupy physical memory have a "lock" on a portion of the physical memory. A "lock" is an attribute of a memory management system that commits or reserves a portion of physical memory to a piece of code or data. In many operating systems, it is typical for a lock to be on a portion of physical memory if that memory contains a piece of code that must be able to run at interrupt time or a piece of data that needs to be accessible at interrupt time or that needs to be accessed asynchronously by hardware devices in the computer.

Initially, the operating system allocates virtual memory to the application programs. However, the operating system will not actually allocate physical memory to an application program until that program attempts to access memory. As code executing in the system attempts to access memory allocated to it, the operating system will allocate physical memory until it is filled, and then start to swap portions of physical memory to the hard drive to accommodate memory accesses.

The virtual memory system typically uses a portion of the hard drive, called a swap file, to swap code and data to and from physical memory. The operating system loads program code such as the executable code of an application program (e.g., a .exe file) directly from the hard drive. As an application requests access to program data, the operating system allocates physical memory, and subsequently, swaps this program data to and from physical memory once physical memory is filled up.

At run time, an application can either implicitly or explicitly request additional memory. An implicit request occurs when an application asks the operating system for a resource such as a new window, and the operating system allocates memory as a side effect to responding to the request for the resource. An explicit request occurs when the application directly invokes a function to specifically ask the operating system to allocate extra memory to it. In both cases, the operating system claims memory for resource allocation from virtual address space.

One form of virtual memory in common use today is referred to as paged virtual memory. In a paged virtual memory scheme, the operating system carries out all memory allocation, de-allocation, and swapping operations in units of memory called pages. In a microprocessor compatible with the 386 architecture from Intel Corporation, for example, a memory page is 4K and each memory segment is made up of one or more 4K pages. The Windows® 95 operating system is one example of an operating system that implements a paged virtual memory system.

Terms commonly used to describe a paged virtual memory scheme include paging, page file, and page fault. The term "paging" refers to the process of swapping code or data between physical memory and secondary storage. The term "page file" refers to the swap file maintained in a secondary storage device to hold pages of code and data swapped to and from the physical memory. Finally, the term "page fault" refers to an interrupt generated by a microprocessor indicating that the memory request cannot be satisfied from physical memory because the page containing the requested code or data is not located in physical memory.

The implementation details of any virtual memory system vary depending on the design and memory addressing scheme of the processor. One of the most widely spread processor architectures in the personal computer industry is the 386 architecture from Intel Corp. The basic memory management features of this architecture are used in 486, Pentium, Pentium II, and Pentium Pro microprocessors form Intel Corp. The 386 architecture supports three operating modes: real mode, protected mode, and virtual mode. Real mode refers to a mode used to maintain compatibility with the 8086 line of processors. This mode has a segmented memory architecture that employs four segment registers to address up to 1 Megabyte of memory. Each segment register points to a first byte of a memory segment. The address register stores on offset address to a byte within a memory segment. The processor combines the contents of a segment register with an address register to form a complete address.

In protected mode, the processor uses the contents of the segment register to access an 8 byte area of memory called a descriptor. The segment register contains an index into a table of descriptors. The processor uses the information in the descriptor to form a base address. It then combines an offset address from the application program to the base address to compute a physical memory address. In this mode, the operating system can use any suitable area of physical memory as a segment. The segments of an application need not be contiguous and can have different sizes.

Virtual mode is similar to protected mode in that it uses the same notion of segments, except that a single segment can be 4 Gigabytes instead of only one Megabyte, and it enables the operating system to implement a virtual memory scheme. Like protected mode, a processor in virtual mode uses the contents of a segment register as an index into a descriptor table. The descriptor table specifies the base address of a memory segment. The operating system sets up the base register to point to the first byte of a program's code or data segment. The processor combines a 32 bit offset address to the base address to compute a final 32 bit address.

When virtual memory is enabled in the 386 architecture, the processor alters the interpretation of this final 32 bit address to map it into a 32 bit physical address. During initialization, the operating system switches the processor into protected mode and then enables paging. The 32 bit address computed by combining the base address with the offset from the program is an address in virtual memory space.

With paging enabled, the processor maps this address in virtual memory space to an address in physical memory space. FIG. 1 is a diagram illustrating how the processor interprets the 32-bit address from an application. The top 10 bits (31 . . . 22) (see 20 in FIG. 1) are an index into a page table directory (22 in FIG. 1). Part of each 32-bit quantity in a page table directory points to a page table (24 in FIG. 1). The next 10 bits of the original address (20 . . . 12) (see 26 in FIG. 1) are an index into the particular page table. Part of each page table entry (28) points to a page of physical memory. The remaining 12 bits of the virtual address (11 . . . 0) (30 in FIG. 1) form an offset within this page of memory.

The operating system stores the address of the page table directory for the current program in a special processor register called CR3 (32). Each time the operating system switches tasks, it can reload CR3 so that it points to the page directory for the new program. The process of mapping a virtual address into a physical address is performed within the processor. Memory caching techniques ensure that frequently used page table entries are available with no additional memory references.

To fully support the virtual memory scheme, page table entries contain more than just a pointer to a page table or physical address. FIG. 2 shows the contents of a single 32-bit word in both the page table directory and page table entry structures (see items 40 and 42 in FIG. 2). The page table directory and each page table consume one 4K memory page (1024 entries in each). This allows the entire 4 GB of a program's address space to be properly addressed. The flag bits in the page table directory allow the system to store the page tables themselves on disk in the paging file. Thus, for large programs (for example, a 1-GB program, which will need 256 page table pages), the system will swap page tables as well as program code and data pages in and out of physical memory.

To fully support the virtual memory operations and the 386 memory protection system, the page directory and page table entries include a number of flag bits. The processor itself modifies some of these flags directly. The operating system manages others. As shown in FIG. 2, these flags include the following bits: D, A, U/S, RJW, and P.

Whenever a program modifies the contents of a memory page, the processor sets the corresponding page table dirty bit (the D bit in FIG. 2). This tells the operating system that if it wants to remove the page from memory to free up space, then it must first write the page out to disk to preserve the modifications.

Any reference—read, write, or execute—to a page causes the processor to set the accessed bit (the A bit in FIG. 2) in the corresponding page table entry. The virtual memory manager can use this flag to determine how often a page has been accessed. One way to tell how frequently a page has been accessed is to set and check this bit periodically to determine whether the page has been accessed. The access bit of a page that is used infrequently will not change if the hardware has not set the access bit. Removing that page from memory is probably a better choice than removing a page that was definitely in use during the same time period. The Windows®95 operating system uses an algorithm known as least recently used (LRU) to determine which page to remove from memory. The more recently used a page, the less likely it is to be re-allocated.

The present bit (the P bit) is set to 1 only when the page table or memory page addressed by the table entry is actually present in memory. If a program tries to reference a page or page table that is not present, the processor generates a not-present interrupt and the operating system must arrange to load the page into memory and restart the program that needed the page.

The user/supervisor bit (the U/S bit) is part of the 386's overall protection system. If the U/S bit is set to 0, the memory page is a supervisor page—that is, it is part of the memory of the operating system itself and no user-level program can access the page. Any attempted access causes an interrupt that the operating system must deal with.

The read/write bit (the R/W bit) determines whether a program that is granted access to the corresponding memory page can modify the contents of the page. A value of 1 allows page content modification. A value of 0 prevents any program from modifying the data in the page. Normally, pages containing program code are set up as read-only pages.

The memory addressing scheme described above enables the operating system to implement a virtual memory system. One limitation of modern operating systems is that they fail to allow applications the flexibility to control how physical memory is allocated when virtual memory is enabled. Typically, the application programs only have access to a virtual memory space, and have little or no control over how physical memory is allocated. This may simplify application development, but it can also degrade performance of an application. For example, it is typical for multimedia applications to use a great deal of memory while they are active. When an application becomes inactive, the virtual memory system tends to swap portions of the application's code and data to the hard drive. Smooth continuous motion of objects on the display and the responsiveness of the user interface are degraded when the virtual memory system performs swapping operations to satisfy memory requests. This is due to the design of the virtual memory system that causes small portions of the application's code and data to be swapped in from the hard drive as the application attempts to access memory.

As noted above, some operating systems, such as the Windows® 95 Operating System from Microsoft Corp., implement virtual memory using a LRU algorithm to control swapping of pages to and from physical memory. As a general rule, this virtual memory system gives the pages of the operating system's dynamically loaded components and all of the pages of the application programs equal priority. Thus, if a game application becomes inactive temporarily, the operating system is likely to swap its pages out of physical memory. When the application becomes active again, the motion of objects on the display and responsiveness of the game to user input stutters as the operating system gradually swaps pages back into physical memory.

One way to address this problem is to lock the physical memory allocated to the application so that no other code has access to that portion of physical memory. For example, in the Windows® Operating system, an application can request a page lock for a piece of physical memory. The page lock causes the operating system to commit a portion of physical memory and remove it from the pool of physical memory available to other executing code. This is not an acceptable solution because it can lead to extremely poor system performance where concurrently executing applications need access to physical memory but are unable to get it due to the application's lock on physical memory.

SUMMARY OF THE INVENTION

The invention is an application programming interface (API) that enables applications to classify code and data in a group that is to be loaded into physical memory together whenever an application attempts to access any part of the code or data in the group. This API enables applications to improve performance in virtual memory systems because it prevents page faults from being spread out over time as an application makes read/write requests to code and data. The application specifies code and data that is part of a group. When the virtual memory system in the operating system signals a Not Present interrupt due to the application's attempt to access code or data in the group that is not present in physical memory, the API implementation causes all of the code and data in the group to be loaded into physical memory together (e.g., in a single series of memory loading operations before the application resumes execution). Thus, the latency of loading code or data from secondary storage is compressed into one period of time, and from then on, all of the code and date in the group is in physical memory.

Additional features and advantages of the invention will become more apparent from the following detailed description and accompanying drawings.

DETAILED DESCRIPTION

The invention is directed toward a virtual memory management system and method that enables application programs to control the allocation of physical memory in a virtual memory system. In one embodiment, the invention is incorporated in an application programming interface (API) entitled "DirectMemory" for the Windows® 95 Operating System, marketed by Microsoft Corporation of Redmond, Wash. Briefly described, the API provides a series of functions or API calls that allow applications to control how the operating system manages access to physical memory.

Figure 1:
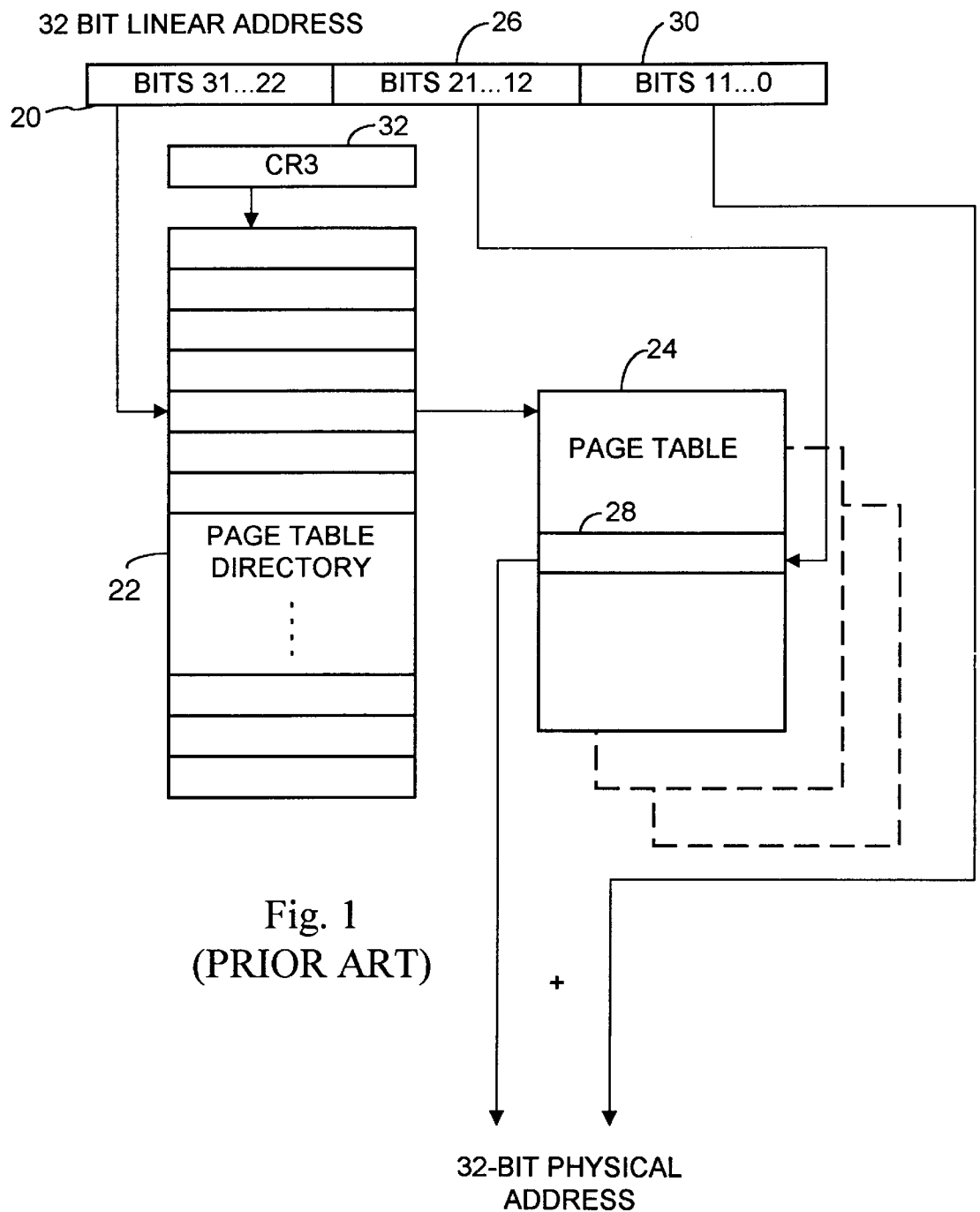
FIG. 1 is a diagram illustrating a virtual memory addressing scheme in the 386 processor architecture.
Figure 2:
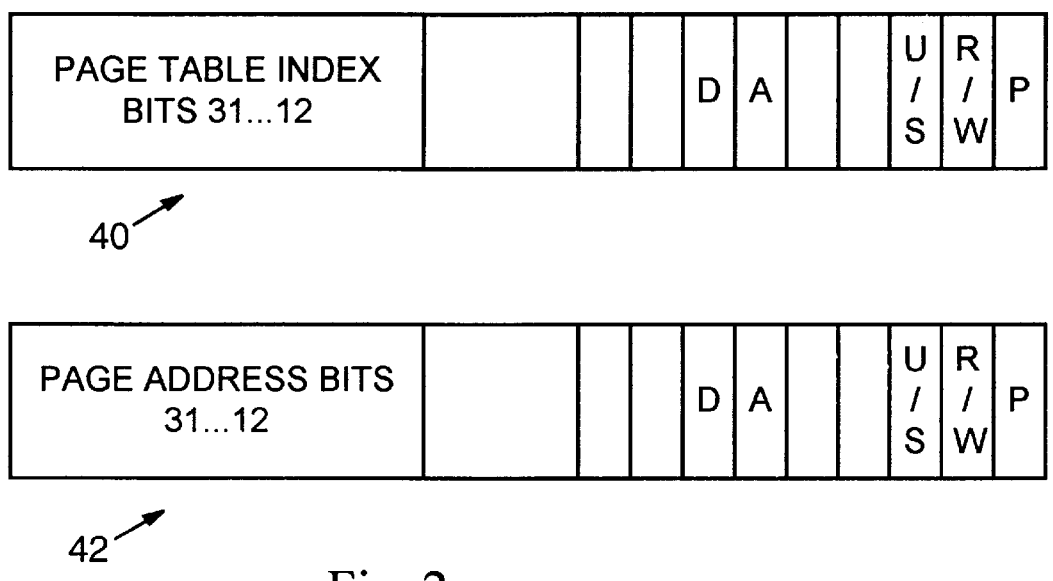
FIG. 2 is a diagram illustrating entries in the page table directory and page table shown in FIG. 1.
Figure 3:
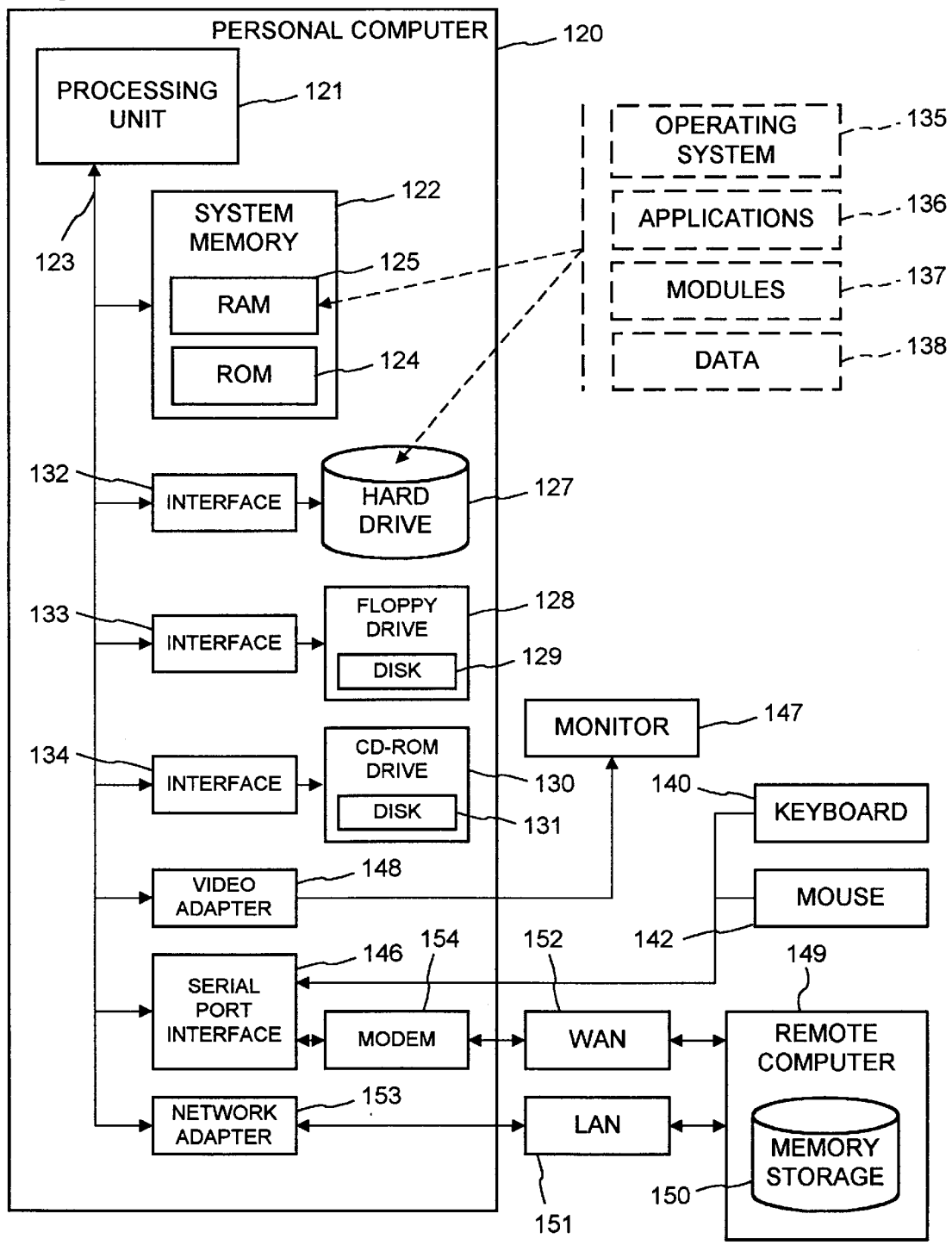
FIG. 3 is a diagram illustrating a computer system that serves as an operating environment for an implementation of the invention.

FIG. 3 and the following discussion are intended to provide a brief, general description of a suitable computing environment in which the invention may be implemented. While the invention will be described in the general context of computer-executable instructions of a computer program that runs on a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 3 illustrates an example of a computer system that serves as an operating environment for the invention. The computer system includes a personal computer 120, including a processing unit 121, a system memory 122, and a system bus 123 that interconnects various system components including the system memory to the processing unit 121. The system bus may comprise any of several types of bus structures including a memory bus or memory controller, a peripheral bus, and a local bus using a bus architecture such as PCI, VESA, Microchannel, ISA and EISA, to name a few. The system memory includes read only memory (ROM) 124 and random access memory (RAM) 125. A basic input/output system (BIOS), containing the basic routines that help to transfer information between elements within the personal computer 120, such as during start-up, is stored in ROM 124. The personal computer 120 further includes a hard disk drive 127, a magnetic disk drive 128, e.g., to read from or write to a removable disk 129, and an optical disk drive 130, e.g., for reading a CD-ROM disk 131 or to read from or write to other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage of data, data structures, computer-executable instructions (program code such as dynamic link libraries, and executable files), etc. for the personal computer 120. Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM 125, including an operating system 135, one or more application programs 136, other program modules 137, and program data 138. A user may enter commands and information into the personal computer 120 through a keyboard 140 and pointing device, such as a mouse 142. Other input devices (not shown) may include a microphone, joystick, game pad, satellite dish, scanner, or the like. These and other input devices are often connected to the processing unit 121 through a serial port interface 146 that is coupled to the system bus, but may be connected by other interfaces, such as a parallel port, game port or a universal serial bus (USB). A monitor 147 or other type of display device is also connected to the system bus 123 via an interface, such as a video adapter 148. In addition to the monitor, personal computers typically include other peripheral output devices (not shown), such as speakers and printers.

The personal computer 120 may operate in a networked environment using logical connections to one or more remote computers, such as a remote computer 149. The remote computer 149 may be a server, a router, a peer device or other common network node, and typically includes many or all of the elements described relative to the personal computer 120, although only a memory storage device 150 has been illustrated in FIG. 3. The logical connections depicted in FIG. 3 include a local area network (LAN) 151 and a wide area network (WAN) 152. Such networking environments are commonplace in offices, enterprise-wide computer networks, intranets and the Internet.

When used in a LAN networking environment, the personal computer 120 is connected to the local network 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

One embodiment of the invention is an API that enables application programs executing in a multitasking operating system to control how a virtual memory system allocates physical memory. More specifically, the API includes functions that enable applications to group their code and data together so that the code and data in the group is loaded into physical memory together. To implement this feature, a virtual memory manager keeps track of code and data in a group. Whenever an application tries to access an instruction or data structure in the group, the virtual memory system will load the entire group of code and data into physical memory.

Applications designate specific pieces of code and data to be classified in a group by invoking an API function call and specifying the address and size of the code or data to be added to the group. For code, the application can specify the name of the function or functions of the application, which implicitly provides the address of the executable code. For data, the application can specify a pointer to a data structure as well as the size of the structure.

In the current implementation of the API, the API includes four function calls pertaining to grouping code and data: 1) CreateGroup; 2) AddMemoryToGroup; 3) DestroyGroup; and 4) DeleteMemoryFromGroup. Applications invoke the CreateGroup function to create a data structure that will keep track of the code or data in a group. Applications can then invoke the AddMemoryToGroup function to add code and data to a specified group. When an application invokes the AddMemoryToGroup function, it identifies code to be added to a group by providing the name of the function and its size, and it identifies data structures by providing a pointer to a data structure and the size of the structure. To delete a portion of virtual memory from a group, an application invokes the DeleteMemoryFromGroup function and specifies the code or data to be deleted. When adding or deleting virtual memory from a group, an application can specify the portions to be added or deleted by specifying a block or set of blocks of virtual memory. A block can be defined by a starting address of a portion of virtual memory and its size. The DestroyGroup function is used to destroy a previously created group.

The current implementation of the APIs for grouping code and data operates in conjunction with the virtual memory management system in the Windows® 95 Operating system. In particular, it uses the services of the physical memory manager in the operating system to allocate physical memory and load code and data into physical memory.

Figure 4:
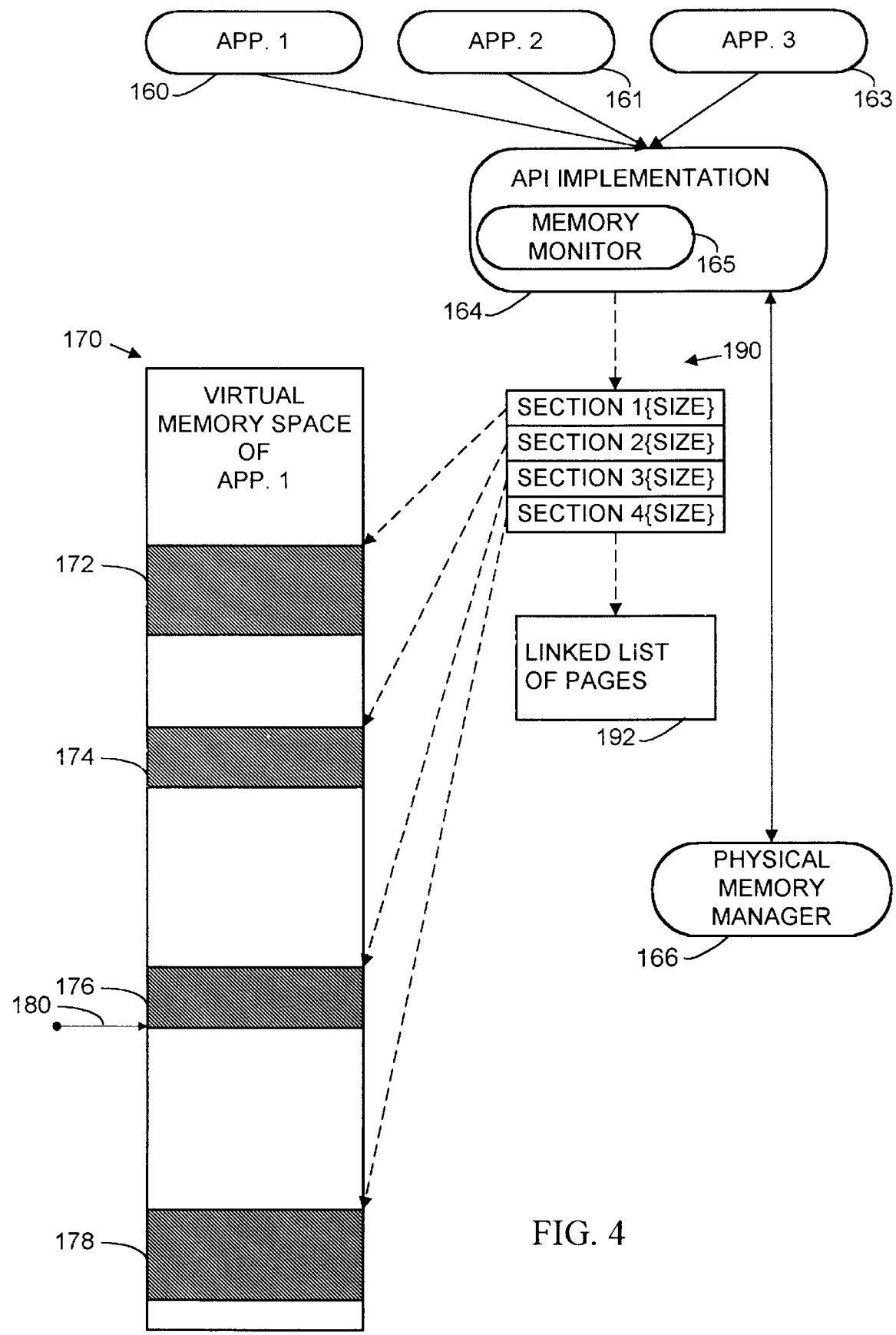
FIG. 4 is a diagram illustrating an implementation of an Application Programming Interface for grouping code and data together for virtual memory management.

FIG. 4 is a diagram illustrating an implementation of the API for grouping code and data and its relationship to the physical memory manager. The applications (app. 1–3) (160, 161, 163) represent concurrently executing applications in a computer, sharing physical memory of the computer. These applications can control the allocation of physical memory by invoking functions of the API implementation 164. A specific example and accompanying description of the API implementation are provided below.

The API implementation 164 includes a memory monitor 165 that monitors for Not Present interrupts. When it detects a Not Present interrupt, the memory monitor 165 determines whether the interrupt has occurred for a memory location of code or data in a group specified by the application. If so, it invokes the physical memory manager 166 and instructs it to load the code and data in the group into physical memory (the RAM in the computer). Using a definition of the memory in the group provided by the memory monitor 165, the physical memory manager 166 loads the code or data in the group that is not already present in physical memory.

FIG. 4 shows an example of the virtual memory space 170 of an application (app. 1) to illustrate the API operates. The virtual memory space 170 is a linear address space of virtual memory allocated to the application 160. Marked sections 172, 174, 176, and 178 are sections of the application's virtual memory space that are associated with code or data that the application has added to a group of memory.

To create a group, the application invokes a function in the API implementation 164 (called CreateGroup) to create a data structure for maintaining a list of the pieces of code and data in the group. The application can specify sections of code or data to be placed in the group as it is being created. The application specifies the code and data to be placed in the group by providing the address and size of the sections of virtual memory used to store the code and data. In this implementation, for example, the application provides an array of pointers to blocks of memory to be placed in the group and an array of parameters that provide the sizes of the blocks.

In response to the request to create the group, the API implementation creates a data structure 190 listing all of the sections of memory. In the example in FIG. 4, the data structure includes a list of four blocks of memory. The address for each block points to a location in virtual memory where the block resides (in this case, the marked sections 172, 174, 176 and 178). The data structure 190 also keeps track of the size of each block of virtual memory in the group.

From this data structure 190, the API implementation derives a list of the units of memory corresponding the code or data in the group. A unit of memory in this context, refers to the unit of memory that the physical memory manager uses to allocate physical memory and to implement a virtual memory scheme. The API implementation is designed for a paged virtual memory system, and as such, the units of memory are 4K pages. The physical memory manager 166 swaps units of memory to and from the hard drive in 4k pages.

To add additional code or data to a group that it has previously created, the application specifies the address and size of sections of virtual memory of the code or data to be added to the group. In response, the API implementation 164 updates the data structure 190 to include the new blocks of memory. It also computes the new units (pages) of memory associated with the blocks and adds them to the linked list of pages 192.

The linked list structure 192 keeps track of the pages used to store the code or data that the application has specified in a group. When the application specifies the address and size of a piece of code or data in the CreateGroup or AddMemoryToGroup functions, the API implementation computes the pages that correspond to this code or data. It then connects these pages in a ring using a linked list structure. Note that a linked list is one possible implementation and there are other alternatives such as using a hash table or other list structure.

The physical memory manager 166 manages the loading of pages from secondary storage to physical memory. It also handles the swapping of pages from physical memory to allow applications to share physical memory. In this implementation, the physical memory manager is part of the Windows® 95 operating system. It implements an LRU scheme for swapping pages between physical memory and secondary storage and includes services for loading pages into physical memory. Given a reference to a page or list of pages, the physical memory manager 166 can load the specified page or pages into physical memory and mark them as present in physical memory.

The memory monitor 165 monitors for Not Present interrupts (namely, page faults). When it detects a page fault, it checks the address of the page and determines whether the page is in the list of pages of any group. The API implementation can maintain several separate groups. Therefore, the memory monitor 165 checks the pages in each group to determine whether the page fault is directed to any page in any group. When the interrupt does touch a page in one of the groups (such as address 180 in FIG. 4), the memory monitor 165 passes a list (or lists) of pages in the group (or groups) to the physical memory manager 166 and instructs it to load each of the pages in each group that contains the page.

The physical memory manager 166 loads all of these pages all at one time before the application resumes executing. Thus, from the perspective of the application, the pages are loaded together. The physical memory manager traverses the list (or lists) of pages in the group (or groups) provided by the memory monitor and loads all of pages that are not already loaded in physical memory. The physical memory manager determines whether a page is already present in physical memory because a data structure that it maintains for each page is marked as being present in physical memory.

The feature of grouping code and data for virtual memory management causes the application to suffer the latency of loading all pages in the group at one time. However, the latency is compressed into one series of load operations, and page faults will be less likely to be spread over time. As well, the group reload is optimized to minimize the amount of disk seek time, which cannot be done if the pages are loaded at random.

The memory grouping APIs cause the code and data in the group to be treated the same for virtual memory management purposes. In addition to being loaded together, the group is treated as a single unit of memory for purposes of virtual memory management. Specifically, the use of all of the pages in each group is tracked together for the purposes of determining when to swap pages back to secondary storage to free up physical memory in response to a memory request for a page that is not in physical memory.

In an implementation for the LRU swapping scheme, all of the pages in a group are treated as accessed when any page in the group is accessed. A block of memory that only resides in one group is marked as used once when any page in the group is accessed. A block that is shared by two or more groups is marked as used for each group that it resides in whenever any page in the shared block is accessed. However, a block that is shared by two or more groups is marked as used only once whenever a page outside the shared block but within any group that includes the shared block is accessed. A block, in this context, is a set of pages. When a block is marked, all of the pages in the block are marked. Since the use of all of the pages in a group are forced to be similar, regardless of actual use, the LRU scheme will swap pages in a group back to secondary storage at or about the same time.

The physical memory manager 166 tracks the use of pages by incrementing a reference count for a page when the page is accessed. In this scheme, the reference count of a block gets incremented by one if the block resides in a group and a page in the group is accessed. The reference count of a shared block gets incremented by the number of groups that share the block if a page in the shared block gets accessed.

Figure 5:
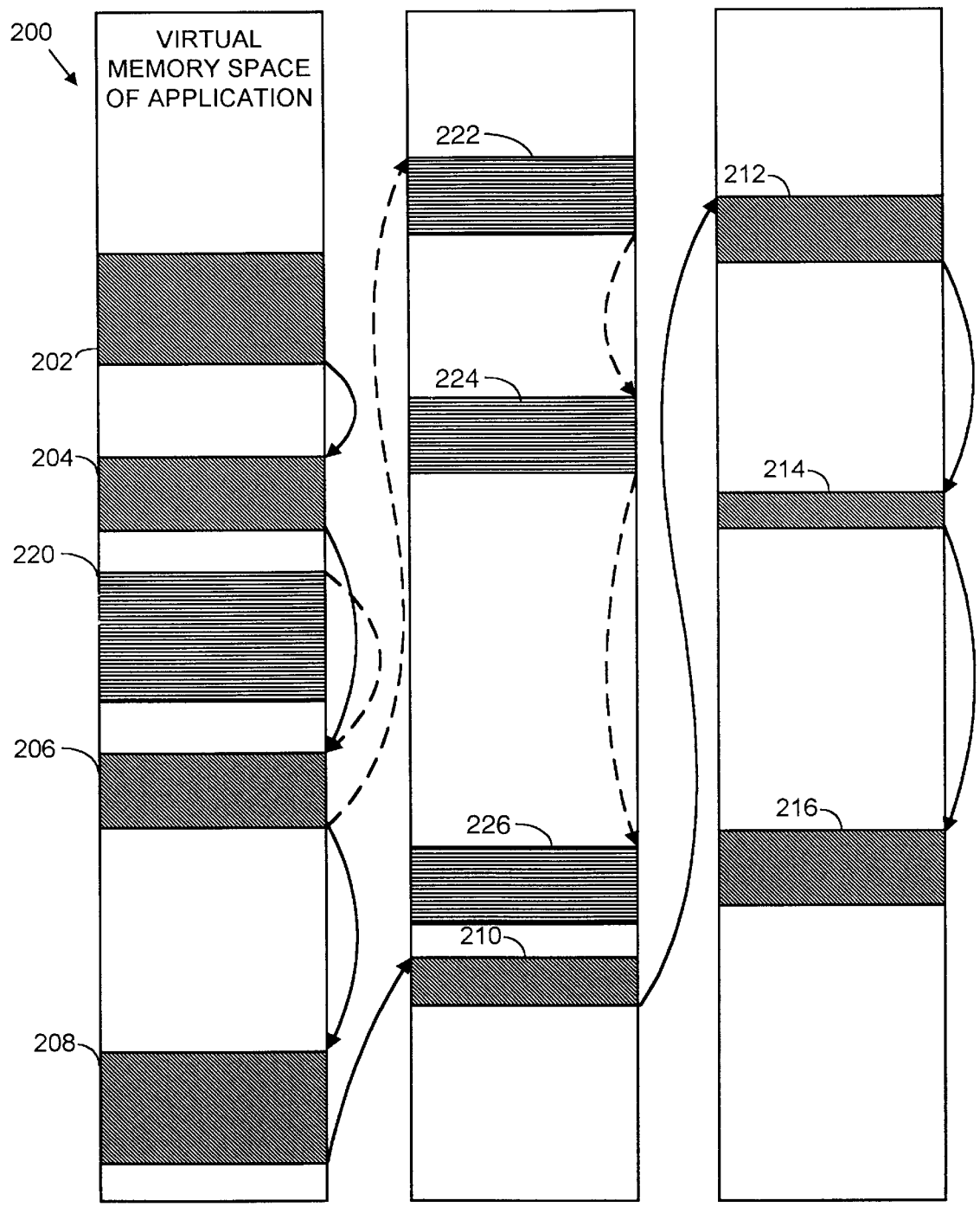
FIG. 5 is a diagram illustrating an example of the virtual memory space of an application to show how the virtual memory management system groups the application's code and data together.

FIG. 5 illustrates an example of the virtual memory space 200 of an application to show how the virtual memory management system groups the application's code and data together. The marked sections of virtual memory (202, 204, 206, 208, 210, 212, 214, 216) in this example are grouped together in a linked list structure and represent a first group of code or data specified by an application. The marked sections of virtual memory (220, 206, 222, 224, and 226) in this example are grouped together in a second linked list structure and represent a second group of code or data specified by an application. The solid arrows represent the link between sections of memory in the first group, and the dashed arrows represent the link between sections of memory in the second group.

If the application that has created these groups attempts to access a piece of code or a data structure in the first group (for example in block 214), then the memory monitor will instruct the physical memory manager to load blocks referred to by numbers 202, 204, 206, 208, 210, 212, 214, and 216 into physical memory. Similarly, if the application attempts to access a piece of code or a data structure in the second group, the memory monitor will instruct the physical memory manager to load the blocks referred to by numbers 220, 206, 222, 224, and 226 into physical memory. If the application attempts to access block 206, the memory monitor will instruct the physical memory manager to load all of the blocks in both the first and second groups.

Once loaded in physical memory, the units of memory (i.e., pages) in a group are reference counted together. For example, if the application accesses block 214, then the pages in block 214 and in all other blocks in the first group are reference counted. Similarly, if the application accesses code in block 204, then the pages in block 204 and in all other blocks in the second group are reference counted. If the application accesses code or data in block 206, a shared block of the first and second groups, then the pages in each block of the first and second group are reference counted once, except for the pages of block 206. The pages in block 206 are reference counted twice because the block is shared by two groups.

A description of one possible implementation of the API called "DirectMemory" is provided below. The functions relating to grouping code and data for virtual memory management include CreateGroup, AddMemoryToGroup, DeleteMememoryFromGroup, and DestroyGroup.

```
DirectMemory::AddMemoryToGroup
    HRESULT
        DirectMemory::AddMemoryToGroup(dwGroupHandle,dwCount,lplpAddr,
        lpdwSize)
    Purpose
    Adds the specified memory biocks to a previously created group.
    Parameters
        dwGroupHandle
            This is the handle used to identify the previously created group.
        dwCount
            This indicates the number of blocks of memory in the list pointed at by lplpAddr.
        lplpAddr
            This is an array of pointers to the blocks of memory to be added to this group.
        lpdwSize
            This is an array of DWORDS which indicate the length of the blocks of memory
            pointed to by lplpAddr.
    Return Value
        DM_OK                           Operation succeeded.
        DMERR_BADGROUP                  This group was not created by CreateGroup.
DirectMemory::CreateGroup
    HRESULT DirectMemory::CreateGroup( dwFlags, lpdwGroupHandle,dwCount,
    lplpAddr, lpdwSize )
    Purpose
    Creates a group that contains sections of memory that should be treated as a single unit for
    purpose of virtual memory management. A group will be paged in, paged out,
    SOFTLOCKed and reference counted as a single piece.
    Parameters
        dwFlags
            DMGROUP_SOFTLOCK
            DMGROUP_PRELOAD
        lpdwGroupHandle
            Points to a DWORD where the new group handle will be returned.
        dwCount
            This is the number of blocks of memory in the list pointed at by lplpAddr.
        lplpAddr
            This is an array of pointers to the blocks of memory to be added to this group as it
```

-continued

```
            is being created.
        lpdwSize
            This is an array of DWORDS which indicate the length of the blocks of memory
            pointed to by lplpAddr.
    Return Value
        DM_OK                           Operation was a success.
        DMERR_BADDADDRESS               Physical address failed.
DirectMemory::DeleteMemoryFromGroup
    HRESULT DirectMemory::DeleteMemoryFromGroup(dwGroupHandle,dwCount,
    lplpAddr)
    Purpose
    Deletes the specified memory blocks from a previously created group. This call will fail if
    all of the blocks specified are not in the specified group.
    Parameters
        dwGroupHandle
            This is the handle used to identify the previously created group.
        dwCount
            This is the number of blocks of memory in the list pointed at by lplpAddr.
        lplpAddr
            This is an array of pointers to the blocks of memory to be added to this group.
    Return Value
        DM_OK                           Operation succeeded.
        DMERR_BADGROUP                  This group was not created by CreateGroup.
        DMERR_BADBLOCKS                 Some of the blocks specified are not part of
        this group.
DirectMemory::DestroyGroup
    HRESULT DirectMemory::DestroyGroup( dwGroupHandle )
    Purpose
    This function destroys a previously created group. All of the pages that are part of this
    group are freed. It is not necessary to delete all of the pages from a group before
    destroying it.
    Parameters
        dwGroupHandle
            Handle of group that was previously created by CreateGroup.
    Return Value
        DM_OK                           Operation was a success.
        DMERR_BADGROUP                  This group handle was not created by
        CreateGroup.
DirectMemory::GetMaxPhysicalMemory
    HRESULT DirectMemory::GetMaxPhysicalMemory( dwFlags,lpdwNumPages )
    Purpose
    Returns to the application the number of pages of physical memory available to an
    application in the best case scenario.
    Parameters
        dwFlags
            DMGMPM_EXCLUSIVEMODE    The physical memory pages for the
            application when it has focus.
            DMGMPM_SHARED           The physical memory pages for the
            application when it does not have focus.
        lpdwNumPages
            The number of 4K pages of physical memory.
    Return Value
        DM_OK                           Operation was successful.
DirectMemory::GetProcessWorkingSetSize
    HRESULT DirectMemory::GetProcessWorkingSetSize( dwFlags,lpdwNumPages )
    Purpose
    This API returns what the operating system considers an application's current working set
    needs to be.
    Parameters
        dwFlags
            DMSPWS_EXCLUSIVEMODE    The working set of the application when it
            has focus.
            DMSPWS_SHARED           The working set of the application when it
            does not have focus.
        lpdwNumPages
            Points to a DWORD where the number of 4K pages of physical memory that this
            application has reserved for it.
    Return Value
        DM_OK                           Operation was successful.
        DMERR_OUTOFMEMORY               Requested working set size is beyond the
        physical memory limitations of this system. The working set for the application was
        not changed.
DirectMemory::SetCooperativeLevel
    HRESULT DirectMemory::SetCooperativeLevel( hWnd,dwFlags )
    Purpose
    To specify the way this application wishes to use DirectMemory and to provide the hWnd
    that DirectMemory should use to track the application's focus.
    Parameters
        hWnd
```

-continued

>>>>This is the hWnd that represents the applications focus.
>>>dwFlags
>>>>DMSCL_PRESERVESTATE   If this flag is set the memory state of the application is preserved when the application loses focus and is restored when the application regains focus before execution begins.
>>>>DMSCL_EXCLUSIVEMODE   If this flag is set the LRU status of pages owned by an application are marked as NOT USED when the application loses focus. Any SOFTLOCKS are released. SOFTLOCKS will be restored when the application regains focus.
>>>>DMSCL_SHARED   If this flag is set the application's SHAREDSOFTLOCKS are not released when it loses focus. There is less memory available to an application through SOFTLOCKS when it does not have the focus. See Lock for ways to specify SOFTLOCKS that survive focus loss.
>>Return Value
>>>DM_OK   Operation was a success.
>>>DMERR_BADHWND   The hwnd specified is invalid or of an incorrect type.

DirectMemory::SetProcessWorkingSetSize
>>HRESULT DirectMemory::SetProcessWorkingSetSize( dwFlags,dwNumPages )
>>Purpose
>>This API allows an application to communicate its working set needs to the operating system so that amount of physical memory can be kept free for it.
>>Parameters
>>>dwFlags
>>>>DMSPWS_EXCLUSIVEMODE   The working set of the application when it has focus.
>>>>DMSPWS_SHARED   The working set of the application when it does not have the focus.
>>>dwNumPages
>>>>The number of 4K pages of memory that this application needs to have to avoid thrashing in normal usage scenarios.
>>Return Value
>>>DM_OK   Operation was successful.
>>>DMERR_OUTOFMEMORY   Requested working set size is beyond the physical memory limitations of this system. The working set for the application was not changed.

DirectMemory::Lock
>>HRESULT Lock( dwFlags, lpAddr, dwSize )
>>Purpose
>>This API specifies the segment of memory that is to be tracked by DirectMemory. The segment will either be added to the SOFTLOCK pool or the MOSTRECENTLYUSED pool. The SOFTLOCK pool is restored and page locked when the application regains focus. The MOSTRECENTLYUSED pool is restored when the application gains focus. This call can fail if the amount of physical memory requested exceeds the application physical memory limitation specified by the end-user.
>>SOFTLOCK requests are higher priority than MOSTRECENTLYUSED requests.
>>SOFTLOCK's can be overridden when the operating system requires memory.
>>SOFTLOCK memory should not be used for DMA or Interrupt Service Routines.
>>Parameters
>>>dwFlags
>>>>DMLOCK_SOFTLOCK   Page lock this memory when the application has focus.
>>>>DMLOCK_SHAREDSOFTLOCK   Page lock this memory even when the apptication does not have the focus. All other rules for SOFTLOCK's apply, this memory may still be reclaimed by the operating system. The amount of memory that can be SOFTLOCKed by an application that does not have the focus is considerably more constrained. The application that has focus has priority.
>>>>DMLOCK_MOSTRECENTLYUSED
>>>lpAddr
>>>>Pointer to the start of the memory to be affected. This pointer is rounded down to the nearest 4K page boundary on 386 Architecture systems. The dwSize parameter is rounded up by the same amount.
>>>dwSize
>>>>Length of the memory affected. The dwSize parameter is rounded up to the nearest 4K page.
>>Return Values
>>>DM_OK   Operation was a success.
>>>DMERR_OUTOFMEMORY   No physical memory left to satisfy this request.

DirectMemory::Unlock
>>HRESULT DirectMemory::Unlock( lpAddr )
>>Purpose
>>To release a SOFTLOCK or MOSTRECENTLYUSED designation on a section of memory that was previously locked.
>>Parameters
>>>lpAddr
>>>>Pointer that was previously passed to Lock.

-continued

| Return Values | |
|---|---|
| DM_OK | Operation was a success. |
| DMERR_NOTLOCKED | Physical address was never locked. |

Though we have explained our invention with reference to a specific embodiment, it is important to emphasize that our invention is not limited to this embodiment. The function calls can be implemented in a variety of programming languages using different forms of data structures. For example, the data structure for maintaining a group of memory does not have to be a linked list, but rather, can be implemented using other conventional types of lists or tables such as a hash table. The implementation is implemented for a paging virtual memory system that uses an LRU scheme to swap pages to and from physical memory. However, the units of memory used to manage physical memory can vary in size and can even by of arbitrary size. In addition, other conventional caching algorithms can be used to determine which units of memory to return to secondary storage when necessary to free up physical memory.

The process for tracking usage of memory blocks or the underlying pages can vary as well. For example, rather than reference counting, a block of memory can be marked as used when accessed and then cleared if not accessed within a predetermined period of time.

The API implementation can be implemented as a modification to the virtual memory system in a multitasking operating system like the Windows® 95 or Windows® NT operating systems. Alternatively, it can be implemented as a separate module that augments the functionality of the operating system.

In view of the many possible embodiments to which the principles of our invention may be applied, it should be recognized that the illustrated embodiment is only a preferred example of the invention and should not be taken as a limitation on the scope of the invention. Rather, the scope of the invention is defined by the following claims. We therefore claim as our invention all that comes within the scope and spirit of these claims.

We claim:

1. In a multitasking operating system that uses virtual memory to share physical memory among concurrently executing application programs, a virtual memory management system comprising:
a physical memory manager for swapping code and data between secondary storage and physical memory to enable applications to share physical memory and for loading units of memory from secondary storage to physical memory;
an API module for grouping portions of code or data in a group in response to a function call from an application program that designates portions of the code or data to be put in the group; and
a memory monitor in communication with the physical memory manager and the API module, the memory monitor operable to monitor a processor for a not-present interrupt, and operable to invoke the physical memory manager to load in all portions of the group not already in physical memory when the processor generates a not-present interrupt in response to a memory request directed to any code or data in the group.

2. The virtual memory management system of claim 1 wherein the memory monitor is operable to track memory accesses to units of memory in a group and is operable to mark all units of memory as accessed when any one of the units of memory in a group is accessed.

3. The virtual memory management system of claim 1 wherein the memory monitor is operable to track memory accesses to blocks of memory that are shared among more than one group and is operable to mark all units of memory in a shared block n times when any one of the units of memory in the shared block is accessed, where n is the number of groups that include the shared block.

4. The virtual memory manager of claim 1 wherein the physical memory manager is operable to monitor memory accesses to units of memory and is operable to swap units of memory from physical memory to secondary storage when necessary to satisfy a request for a piece of code or data that is not present in physical memory.

5. The virtual memory manager of claim 4 wherein the units of memory are pages.

6. The virtual memory manager of claim 4 wherein the physical memory manager marks a unit of memory as used in response to a memory request for the unit; wherein the physical memory manager marks all units of memory in a group as used whenever a unit of memory in the group is accessed, and wherein the physical memory manager selects which of the units to swap from physical memory to secondary storage to satisfy a memory request for physical memory by determining which unit or units are least recently used.

7. The virtual memory manager of claim 1 wherein the API module is responsive to concurrently executing application programs and is operable to maintain data structures representing groups of code or data for more than one application program to be loaded into physical memory together in response to a not-present interrupt for a unit of memory that resides in one or more of the groups.

8. The virtual memory manager of claim 1 wherein the API module is operable to enable the application program to add or delete code or data from the group dynamically, at run time.

9. The virtual memory manager of claim 8 wherein the API module is operable to create and dynamically update a data structure maintaining a list of memory blocks included in the group based on requests by the application to create the group and change the code or data in the group.

* * * * *